United States Patent [19]

Tarasevich et al.

[11] Patent Number: 5,759,708
[45] Date of Patent: Jun. 2, 1998

[54] PROCESS FOR DEPOSITING THIN FILM LAYERS ONTO SURFACES MODIFIED WITH ORGANIC FUNCTIONAL GROUPS AND PRODUCTS FORMED THEREBY

[75] Inventors: Barbara J. Tarasevich, Richland; Peter C. Rieke, Pasco, both of Wash.

[73] Assignee: Battelle Memorial Institute, Richland, Wash.

[21] Appl. No.: 318,540

[22] Filed: Oct. 5, 1994

Related U.S. Application Data

[63] Continuation of Ser. No. 518,813, May 4, 1990, abandoned.

[51] Int. Cl.$^6$ ............................ B32B 11/00; B05D 3/10
[52] U.S. Cl. ......................... 428/689; 427/301; 427/299; 427/333; 117/54
[58] Field of Search ........................... 427/307, 309, 427/333, 301, 299, 129; 117/54, 913, 923; 428/689

[56] References Cited

U.S. PATENT DOCUMENTS

| | | | |
|---|---|---|---|
| Re. 32,603 | 2/1988 | Brockmeyer | 264/44 |
| 2,400,720 | 5/1946 | Staudinger et al. | |
| 2,786,780 | 3/1957 | Walles et al. | |
| 2,858,237 | 10/1958 | Walles et al. | |
| 3,442,683 | 5/1969 | Leroble et al. | 427/129 |
| 3,445,264 | 5/1969 | Haines | 427/129 |
| 3,881,049 | 4/1975 | Brandt et al. | 428/458 |
| 3,914,471 | 10/1975 | Cobb et al. | 427/250 |
| 3,993,835 | 11/1976 | Miedaner | 427/419.5 |
| 4,009,297 | 2/1977 | Redmond et al. | 427/54 |
| 4,152,195 | 5/1979 | Bahrle et al. | 156/656 |
| 4,302,490 | 11/1981 | Byrd | 427/301 |
| 4,373,009 | 2/1983 | Winn | 427/412.1 |
| 4,621,066 | 11/1986 | Nishigaki et al. | 501/128 |
| 4,720,401 | 1/1988 | Ho et al. | 427/250 |
| 4,726,921 | 2/1988 | Niahigaki et al. | 264/63 |
| 4,793,980 | 12/1988 | Torobin | 423/213.5 |
| 4,814,531 | 3/1989 | Cullo et al. | 585/467 |
| 4,911,957 | 3/1990 | Oishi et al. | 427/443.1 |

FOREIGN PATENT DOCUMENTS 2126500  3/1984  United Kingdom .

OTHER PUBLICATIONS

Kasturi Lal Chopra & Inderjeet Kaur–"Thin Film Device Applications" Plenum Press, New York and London.
R.M. Laine (ed.) Transformation of Organometallics into Common and Exotic Materials: Design and Activation, pp. 261–278; 1988 by Martinus Nijhoff Publishers.

*Primary Examiner*—Shrive Beck
*Assistant Examiner*—Fred J. Parker
*Attorney, Agent, or Firm*—Martin L. McGregor

[57] ABSTRACT

A method is provided for producing a thin film product, comprising a first step in which an underlying substrate of a first material is provided. The underlying substrate includes a plurality of unmodified sites. The underlying substrate is then chemically modified wherein a plurality of organic functional groups are attached to a plurality of the unmodified sites. The arrangement and type of the functional group used can be selected for the purpose of controlling particular properties of the second material deposited. A thin film layer of at least one second material is then deposited onto the chemically modified underlying substrate. This can be accomplished by connecting the thin film to the underlying substrate by binding the thin film to the functional groups.

35 Claims, 2 Drawing Sheets

100 nm

PROCESS FOR DEPOSITING THIN FILM LAYERS ONTO SURFACES MODIFIED WITH ORGANIC FUNCTIONAL GROUPS AND PRODUCTS FORMED THEREBY

This is a Continuation of application Serial No. 07/518,813 filed May 4, 1990, now abandoned.

This invention was made with government support under Contract DE-AC06-76RLO 1830 awarded by the U.S. Department of Energy. The government has certain rights in the invention.

BACKGROUND OF THE INVENTION

This invention relates to the production of novel thin films which include respective layers of organic and inorganic materials, and particularly to the production of thin films of inorganic materials by depositing materials onto surfaces that are modified to contain organic functional groups where the organic groups cause and control the deposition process.

There is much interest in the formation of thin film materials for electronic, magnetic, and optical devices, as well as for protective coatings. Thin films are desirable over bulk materials because of their unique properties and ability to be incorporated into integrated devices. Important thin film materials include semiconductors (silicon and GaAs), oxide dielectric interlayers, magnetic films, and ferroelectric films for electro-optical devices, see K. L. Chopra and I. Kaur, *Thin Film Device Applications* (Plenum Press, NY, 1983.) Other applications including abrasion and corrosion resistant protective coatings, sensors, catalysts, and ion exchange devices are discussed in C. J. Brinker, in *Transformation of Organometallics into Common and Exotic Materials: Design and Activation*, edited by R. M. Laine (Martinus Nijhoff, 1988), at pp. 261–278.

Conventional thin film preparation techniques involve two basic processing approaches: 1) the use of liquid solutions or suspension; and 2) precipitation from the gas phase. Liquid solution methods include sol-gel, colloidal particle systems, spray pyrolysis, and electroless and electrodeposition. Gas phase methods include physical vapor deposition (PVD) by sputtering or molecular beam epitaxy and chemical vapor deposition (CVD). Both approaches have disadvantages and limitations that warrant the development of novel thin film preparation methods. Limitations, in general, include difficulties in controlling microstructures, restrictions to certain materials and substrates, and the use of many tedious and expensive processing steps.

More specifically, solution thin film formation methods involve the homogeneous precipitation of colloidal particles or gel solutions which are then cast as films onto surfaces. Colloidal systems have low densities and uncontrolled microstructures due to the use of binder phases or the aggregation of colloidal particles. Polymeric sol-gel solutions result in films with low densities due to the amorphous and porous polymeric structures formed. Microstructures and feature resolution are usually poorly and empirically controlled. Film shrinkage and cracking during drying, crystallization, and sintering become major problems in scale-up of sol-gel technologies.

There is a large volume of articles written concerning general thin film and thick film processing methods using colloidal and sol-gel techniques. These include books such as *Ceramic Processing Before Firing*, G. Y. Onoda and L. L. Hench, eds. (Wiley, NY, 1978); *Better Ceramics Through Chemistry II*, C. J. Brinker, D. E. Clark, D. R. Ultirh, eds.; *MRS Symposia Proceeding*, Volume 32 (North-Holland, NY, 1984); and review articles on sol-gel processing of thin films such as C. J. Brinker in *Transformation of Organometallics into Common and Exotic Materials: Design Activation*, R. M. Laine, ed. (Martinus Nijoff Publ, 1988) 261–278.

Other solution deposition methods, such as electroless deposition, have been described in the prior art. For example, U.S. Pat. No. 3,881,049 discloses a process for depositing a copper layer on a surface of a shaped article of a polyimide. Reducing agents are used on the surface to cause the reduction of a metal salt. U.S. Pat. No. 4,009,297 discloses a method for electroless gold plating in which gold is deposited on a surface by the reduction of gold ligand complexes using reducing agents. The process comprises: a) treating the surface with a solution of a noble metal salt and a halogenated, alkanoic acid, and then drying the surface at an elevated temperature; and b) treating the surface with a solution including a reducing agent but which does not include a halogenated alkanoic acid, steps (a) and (b) being carried out in either order, and then treating the surface with a solution containing a copper salt and a reducing agent. These processes as well as electroless deposition processes in general are limited to metal deposition and plating and require that catalysts are used to reduce the metal and form nucleation sites on the substrate surface. U.S. Pat. No. 4,720,401 relates to a technique for increasing the adhesion between metals and organic substrates. A method of producing metallized thermoplastic articles is set forth in U.S. Pat. No. 3,914,471. U.S. Pat. No. 4,152,195 discloses a method of improving the adherence of conductive metallic lines to a polyimide resin layer by incompletely curing the polyimide resin layer prior to deposition of the metal layer, and subsequently curing the polyimide resin layer after the metal layer is deposited. Low temperature fired ceramic products are formed in U.S. Pat. No. 4,621,066 and U.S. Pat. No. 4,726,921 by firing a mixture of powder glass and powder $Al_2O_3$. U.S. Pat. No. 4,814,531 relates to crystalline silica-titania composite zeolite materials and their use as catalysts in hydrocarbon conversion reactions requiring acidic conditions for catalysis. In U.S. Pat. No. Re. 32,603, a impregnated ceramic foam material and process for making same is provided in which the foam is impregnated with an alumina hydrate binder and then fired at an elevated temperature to form a solid state sintered ceramic bond. Finally, in U.S. Pat. No. 4,793,980, hollow porous microspheres are used as substrates and containers for catalysts in the production of microsphere catalysts.

PVD and CVD technologies involve the direct growth of materials by heterogeneous nucleation from the gas phase. Advantages over liquid processing methods include the formation of dense films, ultrafine microstructures, and oriented grains. Disadvantages, however, are that gas phase processes are expensive and complicated; deposition rates are very slow, desirable microstructures are difficult to obtain and largely empirically controlled; and the processes provide limited control over the kinetics and thermodynamics of deposition, although oriented polycrystalline substrates for epitaxial growth are severely restricted to single crystal oriented substrates with closely matched lattice spacings to the desired phase and face. Sputtering processes are highly energy intensive, have low film formation rates, and require targets of the materials desired. CVD processes are limited to reactive gases and require high substrate temperatures which limit the choice of substrate materials. Other problems in both gas phase techniques include the formation of nonstoichiometric phases due to oxygen deficiencies, unwanted compounds or phases, and hydrocarbon contamination.

The above prior art has disadvantages and limitations as discussed previously. Solution methods such as sol-gel and colloidal processes form low density films which crack and shrink during drying and sintering. Electrodeposition processes only occur on metal substrates and electroless deposition has only involved deposition of metals. Vapor deposition processes are expensive and require specialized equipment and are limited to certain substrates and materials. Phases and orientations are often difficult to control. Disadvantages and limitations in thin film deposition methods, therefore, warrant the development of new methods.

Consequently, a need exists for solution methods which allow greater simplicity and reduced cost of production where thin films can be deposited on an underlying substrate at relatively low temperatures. Processes of this invention allow the deposition of thin films, preferably high density films. They also control the product microstructures including control of the crystallinity phase and orientation of the deposited materials. It is desirable to control properties such as orientation because many properties such as magnetic, superconducting, optical, and ferroelectric properties depend on orientation, being anisotropic with the requisite orientation.

SUMMARY OF THE INVENTION

The method and product of the present invention overcomes all of the existing needs described above and provides for the formation of thin films with desirable and advantageous properties employing a process which provides the requisite levels of simplicity, reduced cost, and fewer processing steps.

A method of the present invention is provided for producing a thin film product, comprising a first step in which an underlying substrate of a first material, preferably an organic material, is provided.

The underlying substrate is then chemically modified wherein a plurality of functional groups, preferably organic functional groups, are attached thereto. The presence of functional groups is essential because they facilitate the deposition of a second material, preferably an inorganic material, onto the underlying substrate. Preferably, the deposition of the second material in the form of a thin film occurs by nucleation of the second material onto the substrate surface specifically at the organic functional groups and growth of the second material thereon. The arrangement and type of the functional group used can be selected for the purpose of controlling certain properties of the second material deposited, such as orientation and density.

A thin film layer of at least one second material is then deposited onto the chemically modified underlying substrate. This can be accomplished by connecting the thin film to the underlying substrate by binding the thin film to the functional groups. Without first attaching functional sites as described above, no deposition of the second material onto the underlying substrate will occur. For example, prior to deposition of the thin film, the chemically modified substrate can be introduced into a liquid solution, preferably containing metal salts. In this case, the pH, temperature, and concentration of metal salts can be varied. By controlling the type and nature of the functional groups, and the solution conditions, high density, continuous thin films having little or no porosity are deposited. High density films are formed by this process because it is thought that deposition occurs by growth of the second material which is more space filling than, for instance, colloidal or gel processes. The resultant thin films are highly adherent to the surface. Furthermore, by controlling the surface site type and density, crystallites with preferred orientation can be grown. This growth of the thin film onto the underlying substrate is promoted by the organic functional groups. This is advantageous because, by employing the process of the present invention, oriented crystals can be formed even on surfaces that are organic, polymeric or non-crystalline. The subject invention therefore provides a method for conducting an economical solution deposition process resulting in thin films having preferred properties such as high density and orientation.

The process of the present invention can preferably include underlying substrates comprising polymeric materials such as polystyrene (most preferred), polyethylene and polyimide; oxides such as glass, silica and alumina; and metals such as gold. The inorganic materials will undergo optimum deposition using certain of these functional groups, depending on the interactions between functional groups and ions or species in solutions.

The step of modifying the polymeric material can be conducted, for instance, using an acidic group such as a sulphonate group as the functional group Concentrated sulfuric acid or $SO_3$ gas can be employed to perform such sulphonation. Other functional groups which can be employed include acidic groups such as phosphates, carboxylates, basic groups such as amines and hydroxyls, or neutral groups such as alcohols and thiols.

The density of the organic functional sites attached can be controlled by controlling the reaction time or gas partial pressure. Functional sites can be arranged randomly on the surface or can be arranged in a highly ordered, crystalline manner. In addition, these functional sites can be directly attached to the underlying substrate or can be attached indirectly via a surface attachment group connected to an alkyl chain which in turn is connected to the functional group.

The underlying substrate modified with a plurality of functional groups is preferably introduced into a liquid solution so that the deposition step can be conducted in liquid phase. The liquid solution can comprise either an aqueous or a nonaqueous solution. The liquid solution can include metal salts precursors to the inorganic phase such as metal salts and metal alkoxides.

The second material can be deposited from aqueous or non-aqueous, acid or basic solutions, i.e., from acidic aqueous solutions at temperatures up to 100° C., or from solutions that become basic by the decomposition of urea at elevated temperatures, or by the diffusion of ammonia into the solutions at room temperature.

The second material, preferably an inorganic material, can comprise a ceramic material, such as an iron oxide ceramic material, which is substantially crystalline. The inorganic groups can comprise either substantially crystalline or amorphous materials. Other inorganic materials which can be employed herein include alumina, silica, PLZT and PZT ferroelectrics (lead zirconate titanate compounds), barium titanate, barium ferrite, 123 superconductors (high temperature ceramic superconductors), lithium niobate, and CdS. In one preferred embodiment, the inorganic material consists of roughly spherical particles having an average diameter of not more than about 1000 angstroms, more preferably not more than about 500 angstroms, and most preferably not more than about 200 angstroms.

The second material produced by the method of this invention preferably has at least one oriented crystalline axis oriented with respect to the surface of the underlying surface. More preferably, the [001] axis of goethite and akaganeite is oriented normal to the surface of the underlying substrate. Moreover, the second material produced herein is preferably a crystalline material comprising akaganeite, goethite, or magnetite.

In a preferred method, the modified functional group site type is selected, and density is controlled, so that the thin film produced is substantially continuous, with a density greater than about 90% of total surface coverage. Thus, the method of this invention preferably produces a thin film product of such a sufficiently high density that sintering thereof is not required, particularly for the uses described above. The method of this invention can also include the step of controlling the grain size of the deposited material by controlling the surface site density and the supersaturation conditions of the deposition step.

The subject method can produce a thin film product by using organic functional sites attached to an underlying substrate to cause the deposition of the second material. The deposition steps are conducted at a temperature which is preferably not more than about 100° C.

In a preferred method of this invention, a first predetermined pattern of organic functional groups is formed on the underlying substrate. A second predetermined pattern of the second material is then formed by selectively depositing it onto the underlying surface by binding of the second material only to the organic functional groups. Preferably, the first predetermined pattern formation step includes the step of, prior to said chemical modification step, masking the underlying substrate to thereby form the predetermined pattern. In this way, the predetermined pattern of functional groups is confined to the unmasked region.

The foregoing and other objects, features and advantages of the invention will become more readily apparent from the following detailed description of a preferred embodiment.

DETAILED DESCRIPTION OF A PREFERRED EMBODIMENT

EXAMPLE 1

Figure 1:
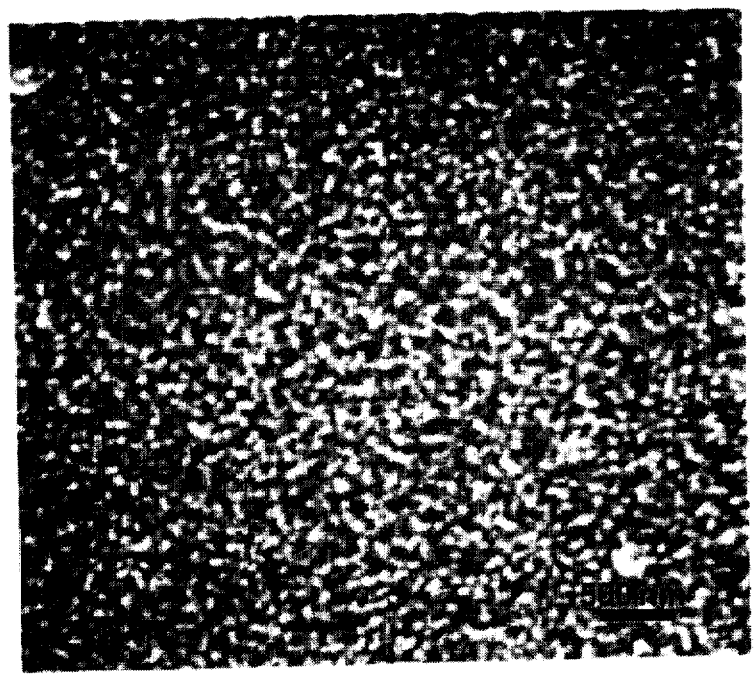
FIG. 1 is an SEM (scanning electron microscopy) micrograph of a sample prepared by the procedure described in Example 2 below. The SEM micrograph comprises an akaganeite thin film deposited onto a polystyrene underlying substrate which has been chemically modified with sulphonate sites prior to thin film deposition. The SEM micrograph shows a continuous, high density thin film with 200–300 angstrom grain sizes.

The thin film products of this invention were produced according the following exemplary procedure:

(a) Substrate Formation. Polystyrene substrates were obtained commercially or thin films formed by dissolving polystyrene beads in a xylene solvent and dip coating acetone-cleaned glass slides. Slides were dipped 2 to 4 times with an hour of drying time between each dip. Cast films were heat treated at 100° C. for 5–12 hours. The substrate surfaces were cleaned by ultrasonication in methanol and drying with nitrogen.

(b) Substrate Surface Modification. Sulphonate sites were attached to the polystyrene substrates or cast film surfaces by placing the substrates in a concentrated sulphuric acid solution for various time periods (ranging from 5 minutes to 48 hours). Sulphonate sites were also attached by placing the substrates into a reaction vessel which is connected to a vacuum manifold. A flask containing sulphur trioxide ($SO_3$) was attached to the manifold. The manifold and reaction vessel was placed under vacuum to nearly 0 to 1 torr and $SO_3$ gas was introduced into the reaction vessel to 125 torr. The $SO_3$ was allowed to react with the substrates for from 5 seconds to 15 minutes and the reactor was purged with dry nitrogen gas. Substrates were removed, rinsed 4 times in deionized water, and dried under dry nitrogen gas.

The presence of sulphonate sites was determined using ATR-FTI and x-ray photoelectron spectroscopy. The sulphonate groups attach onto the benzene ring of the polystyrene polymer. The sulphonate site density can be varied by varying the surface reaction time and gas partial pressure. The surface site density can be characterized qualitatively by measuring the contact angles of aqueous buffer solutions onto the surface. The contact angles decrease as the surface site density increases. Very high sulphonate site densities were achieved as evidenced by contact angles as low as 0°–10°. For surfaces with very low contact angles, the density of sulphonate sites approaches the maximum density possible. It is thought that the maximum possible site density is approximately $5 \times 10^{14}$ sites/$cm^2$ (or 4.6 angstroms intersite spacing) which is the maximum density of carboxylate sites in stearic acid monolayers. The sites are arranged randomly since the polystyrene substrate is noncrystalline, and the benzene rings in its structure are randomly arranged. Contact angle titrations of aqueous buffer solutions at various pH values indicate that the sulphonate sites are ionized at very low pH (pH 2 or 3) indicating a highly acidic site.

Thin Film Deposition. Aqueous iron chloride and iron nitrate solutions were prepared as hereinafter described with varying iron concentration, iron oxidation state, and amounts of acid or urea. Iron salt solutions were prepared fresh or were diluted from highly concentrated stock solutions so as to minimize hydrolysis before use. These solutions were acidic and had pH values between about 2 and 3. Sulphonated substrates were placed into solutions at room temperature for 15–30 minutes so that adsorption of cations or cation complexes could occur at the surface. It is believed that iron cations or cation complexes initially adsorbed onto surface sulphonate sites because the substrates appeared faintly stained and infrared spectroscopy indicated changes and shifts in the sulphonate peaks. It appeared that this adsorption occurred rapidly and it is expected that fairly strong electrostatic bonding would occur between positively charged iron cations and the negatively charged sulphonate sites. The substrates were then placed into a solution in sealed Teflon® containers or a two part reaction flask. In some cases, the containers were placed into a temperature controlled oven at temperatures up to 100° C. or the reaction flask was heated with a temperature controlled heating mantle to temperature up to 100° C. In some cases, samples were placed into solutions in containers with jar tops with holes in them and these containers were placed into a desiccator with a container of concentrated ammonium hydroxide.

Samples were kept in solutions so that deposition of crystallites and thin film formation could occur. It was thought that growth of crystallites on the surface occurred by hydrolysis and condensation reactions of cations and cation species adsorbed or bound onto the surface sites. It was thought, therefore, that the surface functional sites acted as nucleation sites from which formation of critical nuclei and growth of these critical nuclei occur. The hydrolysis and condensation reactions could occur faster by heating solutions or by increasing the pH of the solution by heating solutions containing urea to at least 75° C. so that the urea decomposed into ammonium ions and carbon dioxide or by diffusion of ammonia vapors into containers. In this way, growth of thin films could occur under acidic conditions at elevated temperatures up to 100° C. or under basic conditions at room or elevated temperatures up to 100° C.

Samples were removed at various time periods and were rinsed in deionized water. Formation of a thin film was evidenced by the appearance of a yellow-orange to red layer of iron oxide on the clear surface of the polystyrene. The samples were removed before any large particles could form in solution and adsorb onto the surface of the thin films grown on the surface. If any particles adsorbed onto the thin film surface these particles could be removed by ultrasonicating the samples. In some cases, samples were then placed into deionized water solutions containing acid or urea and these were placed into a temperature controlled oven at temperatures up to 100° C. so that the thin films could be aged for 5 to 24 hours. The samples were then removed, rinsed with deionized water, ultrasonicated for 15 to 30 minutes, and dried with dry nitrogen.

The thin films prepared in this manner were examined to confirm the presence of iron oxide. ATR-FTI examination of the surfaces resulted in infrared peaks indicating the presence of iron oxide material. Electron dispersive spectroscopy confirmed the presence of iron in the samples. Samples were placed into xylene solutions in order to dissolve the polystyrene. Solutions were filtered to collect iron oxide powder fragments and ground fragments were examined by powder x-ray diffraction techniques. The thin film samples were examined under scanning electron microscopy (SEM) and fragments of the thin films were examined under TEM.

It was found that there was no deposition on substrates that contained no sulphonate sites. The amount of iron oxide that was deposited increased with an increase in the sulphonate site density so that very little iron oxide was deposited when there were very few sulphonate sites, but a large amount was deposited when the sulphonate density was high. It was also found that films that were deposited on sulphonated substrates with contact angles of 25° or less had high densities of iron oxide crystallites and formed continuous films with little to no porosity as evidenced by SEM examination. This is one of the advantageous characteristics of this process, that continuous, high density thin films of oxide materials can be deposited from solution. It is thought that the high densities occur because the nucleation and growth processes occur on the surface by ion-by-ion deposition which is more space filling than gel or colloidal particle packing processes.

The thin films grown on the surface were tightly adhered to the surface even though it would not be expected that an oxide film would be tightly adhered to a polymer surface. Adhesion is greater using the process of the present invention rather than if sol-gels or colloidal solutions of particles were cast and dried onto the surface. It is believed that adhesion is greater by this process because there were strong electrostatic binding interactions between the surface sulphonate sites and the cations of the iron oxide lattice that occur during the nucleation and growth process.

Films prepared by this process contained crystallites of a diameter as small as 200 angstroms and no larger than 1000 angstroms. This is an advantageous property of this process because small crystallite sizes result in higher surface smoothness which affects properties such as dielectric loss. A small crystallite size is also desirable for magnetic tape applications since storage density can be increased and there is a crystallite size dependence on ferroelectric and other properties. It is thought that growth on the surface affects the crystallite size by controlling the number of nucleation sites and because coalescence and aggregation does not occur. It was found that crystallites grown homogeneously in solution were aggregated and were larger in size than crystallites grown on the surface.

Some films prepared by this process contained akaganeite ($\beta$-FeOOH) and goethite ($\alpha$-FeOOH) crystallites and it was found that these crystallites were anisotropic in nature, forming a needle-like structure. It was known in the literature that the longitudinal axis was the [001] direction and it was found that the needle-like crystallites were oriented so that the longitudinal [001] direction was normal to the surface. This result was shown in SEM and TEM photographs shown in FIGS. 2 and 3. It was an outstanding feature of this invention that it was possible to form oriented crystals onto a surface of a substrate. This preferred orientation was found for surface sites that have contact angles of 20° or less. It was thought that the control over the arrangement, type, and density of surface sites caused the growth of oriented crystallite because adsorption of cations onto surface sites arranges the cations in certain spacings which, in turn, was energetically more favorable to nucleate crystals in a certain location. It was thought that the intersite spacing of sulphonate sites on the substrate surface was at least 4.6 angstroms. Crystallites likely grow from planes perpendicular to the [001] plane (such as the (004) plane) because cations in this plane are spaced farther apart (4.6 angstroms for goethite and 10.5 angstroms apart for akaganeite). These spacings more closely match to the spacings of the sulphonate sites on the surface. Cations in planes parallel to the [001] direction or along the [001] direction have cations with spacings of around 3 angstroms. Nucleation does not occur from these planes since cations cannot be arranged at the surface sites with spacings that close.

It is an important property of the subject process that oriented crystallites can be grown because, in the prior art, the above-described orientation of growing crystallites only occurs on crystalline inorganic substrates. In contrast, the present process of this invention results in formation of oriented crystallites deposited onto noncrystalline substrates and specifically onto polymer substrates. The iron oxide crystallites such as akaganeite and goethite can be converted to magnetic phases for magnetic tape production having properties which are substantially better than current magnetic tapes.

In prior art, anisotropic goethite or akaganeite particles are formed homogeneously in solution and are converted into the magnetic phase, maghemite, by heat treatment. These particles are dispersed into surfactant-binder solutions, oriented in a magnetic field and cast onto substrates so that the |001| direction is parallel to the substrate resulting in longitudinal magnetization. It is desirable and of interest to orient these crystallites perpendicular to the surface to allow perpendicular magnetization which allows higher storage densities. It has not been possible to orient crystallites perpendicular to the surface by the prior art. The method described in this patent allows the direct growth of anisotropic crystallites with [001] perpendicular to the surface. This method allows the formation of high density, reduced thickness iron oxide tapes with perpendicular magnetization by a process with fewer processing steps at reduced cost.

EXAMPLE 2

Using a procedure similar to that described in Example 1 above, solutions containing 0.1M $FeCl_3$ and 0.001M HCl were prepared at an initial solution pH of 2.0. Sulphonated substrates with aqueous buffer solution contact angles of less than 20° were placed into the solutions in sealed Teflon® containers for 30 minutes. Containers were placed into an oven at 75° C. for 90 minutes. Samples with deposited thin films were removed and placed into 0.001M HCl solutions and placed into an oven at 75° C. for 24 hours. X-ray examination indicated formation of akaganeite and SEM micrographs indicated the formation of densely packed, nanometersized crystallites as shown in FIG. 1.

EXAMPLE 3

Figure 2:
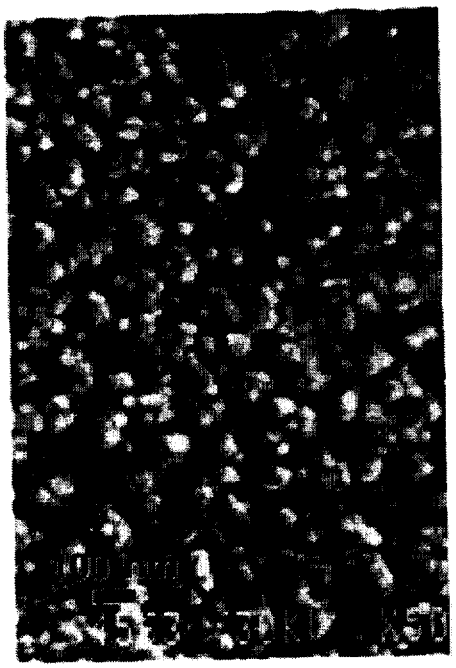
FIG. 2 is an SEM micrograph of a sample prepared by the procedure described in Example 3 below. The thin film is at a 10 degree tilt. This micrograph shows a high degree of orientation of anisotropic crystallites with the [001] axis perpendicular to the underlying surface.
Figure 3:
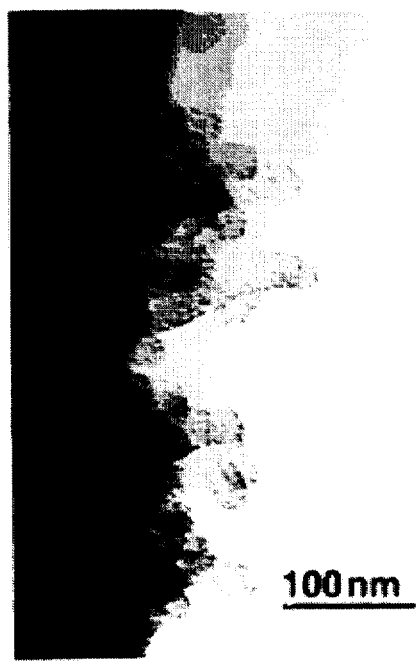
FIG. 3 is an TEM (transmission electron microscopy) micrograph of a cross-section of the thin film of FIG. 2. This micrograph also shows a high degree of orientation of anisotropic crystallites with the [001] axis perpendicular to the underlying surface.

Using a procedure similar to that described in Example 1 above, sulphonated substrates were placed into 0.01M $FeCl_3$ solutions for 96 hours at ambient temperature (about 23° C.). Substrates were removed and washed in deionized water and placed into 0.5M NaOH solutions in a 75° C. oven for 24 hours. Substrates were removed, washed in water, ultrasonicated in water for 15 minutes and dried with dry nitrogen. SEM examination of this sample tilted at 10° is shown in FIG. 2 and shows that the crystallites were needle-like and all oriented with the long axis or [001] axis perpendicular to the substrate surface. TEM examination of fragments of this sample showing the substrate in cross section were shown in FIG. 3 and also show the elongated axis oriented perpendicular to the substrate. The micrographs also indicate that the size of the crystallites were approximately 200–300 angstroms in diameter and 1000 angstroms in length.

EXAMPLE 4

Using a procedure similar to that described in Example 1 above, sulphonate substrates were placed into a solution containing 0.01M $Fe(NO_3)_3$ and 2M urea in a sealed Teflon® container for 30 minutes. The container was placed into an oven at 100° C. for 45 minutes, resulting in a final solution pH of 6.75. Substrates and deposited films were removed, rinsed, and placed into 2M urea solutions at 100° C. for 24 hours. Substrates and deposited thin films were removed, rinsed, ultrasonicated in water for 15 minutes, and dried with dry nitrogen. X-ray examination indicated the formation of goethite.

EXAMPLE 5

Sulphonated substrates prepared as described in Example 1 above were placed into solutions containing 0.2M $FeCl_3$ and 0.1M $FeCl_2$ for 30 minutes. Containers with paper covered openings in the jar lid were placed into a desiccator containing a solution of ammonia at ambient temperature (about 23° C.). Substrates were removed after 72 hours, rinsed, ultrasonicated for 15 minutes and dried with nitrogen. X-ray examination indicated the formation of magnetite.

Figure 4:
FIG. 4 is a photograph of a substrate prepared by the procedure set forth in Example 5 below showing a pattern of an iron oxide thin film deposited onto a polystyrene substrate, produced by forming predetermined a pattern of sulphonate organic functional groups prior to the deposition of the iron oxide thin film. The photograph shows a sharp interface and highly localized deposition onto the patterned, chemically modified sulphonated regions.

In addition to the formation of continuous thin films, it was possible to directly deposit inorganic materials in "pattern". It was found that deposition of iron oxides only occurred on surfaces that contained sulphonate sites and that no deposition occurred on surfaces that did not contain these sites. This occurs because the surface sites are thought to cause deposition by acting as nucleation or adsorption sites. It was also found that the sulphonated sites could be patterned onto the surfaces by asking the surface and sulphonating the surface using $SO_3$ gas. Attachment of sulphonate sites only occurred on the regions that were not covered by an adhesive mask. The mask was removed and the substrate was placed into iron oxide solutions as described in the example below and substrates were removed. Deposition occurred only in the locations that were sulphonated (See FIGS. 4 and 5). This highly localized deposition probably occurs because the interactions between cations and sulphonate sites are much stronger than the interactions between cations and the underlying substrate. This allows the direct deposition of patterns of inorganic materials.

Direct deposition of patterns from aqueous solutions is not possible by the processes of the prior art. In the prior art, formation of patterns normally occurs by first depositing a continuous thin film on a substrate, placing a mask over the thin film, exposing certain regions of the mask, washing away the exposed or unexposed regions (depending on the mask used) leaving a pattern of exposed thin film regions and the mask. The exposed thin film regions are then etched away to form a pattern in the thin film and the mask is removed. The etching process is often corrosive and damaging to the device and often time consuming. Therefore, it would be highly advantageous to eliminate this etching. Direct deposition of inorganic patterns onto inorganic surfaces is not achieved because there are no preferred sites for deposition on the inorganic surface—for most surfaces the interaction energies between surface sites and ions or atoms in the solution or gas phase are fairly weak (usually van der Waals) and do not vary much over the surface. As a result, deposition occurs over the entire surface. In the subject process, the interactions between ions or species in solution are much stronger between the attached acidic surface sites than the unmodified surface sites. This allows highly specific and localized deposition when the sites are arranged in patterns by masking techniques.

EXAMPLE 6

Figure 5:
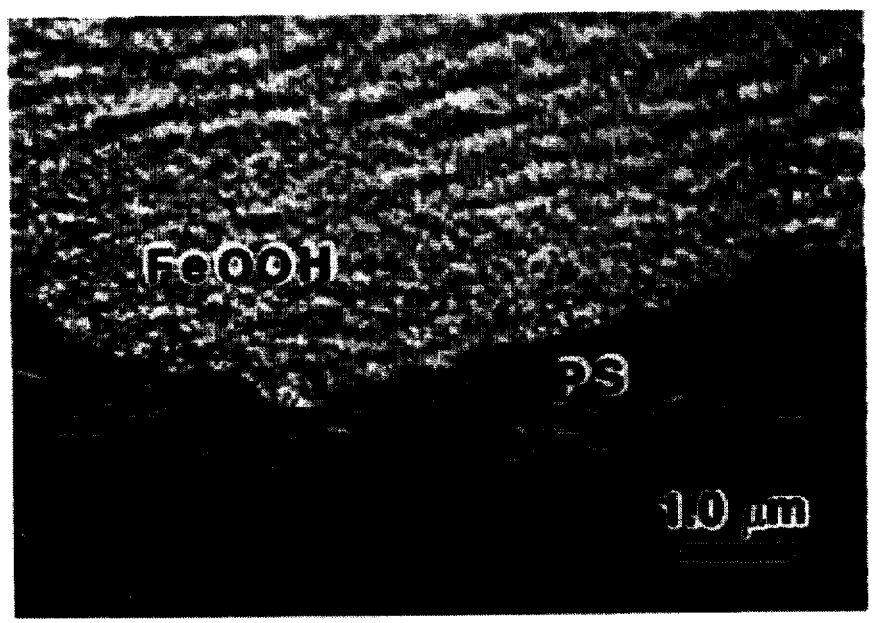
FIG. 5 is an SEM micrograph of the substrate depicted in FIG. 4 depicting the interface between the iron oxide thin film deposited onto sulphonate modified sites (FeOOH) and unsulphonated unmodified polystyrene. The micrograph shows a sharp interface and highly localized deposition onto the patterned, chemically modified sulphonated regions.

As described in Example 1, a polystyrene substrate was prepared and covered with a vinyl mask with an adhesive on one side. The mask was placed onto the substrate and the substrate was placed into a reaction flask connected to a vacuum manifold with $SO_3$ in a flask attached to the manifold. A sulphonation reaction occurs as described previously. Samples were removed, washed in deionized water (4 rinses), dried, and the mask was removed. The surface was washed with heptane to remove any adhesive on the surface. The substrate was placed into a solution of 0.1M FeCl$_3$ and 0.001M HCl for 30 minutes, in a sealed Teflon® container in 75° C. oven for 90 minutes. It was then removed and placed in 0.001M HCl solution at 75° C. for 24 hours. The substrate was again removed and washed. A photograph of the sample shown in FIG. 4 indicates that deposition was localized to form letter and number patterns. An SEM of the sample shown in FIG. 5 shows that there is a sharp edge between the deposited layer on the sulphonated surface and the unsulphonated layer, indicating that deposition was localized.

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for producing a film, comprising providing an underlying substrate of a first material; chemically modifying at least one surface of said underlying substrate by attaching thereto organic functional groups which provide nucleation sites for inducing crystallite growth of an inorganic second material on said underlying substrate; and contacting at least one chemically modified surface with a liquid solution of precursors of the inorganic second material for a sufficient period of time for the crystallite growth of a second material formed from the precursors of the inorganic second material in the liquid solution onto the modified underlying substrate by nucleation of the second material on said nucleation sites thereby forming inorganic crystallite second material grown onto said nucleation sites, said nucleation sites being chemically attached to said underlying substrate.

2. The method of claim 1, wherein said first material comprises polyethylene.

3. The method of claim 1, wherein said first material comprises a polymeric material.

4. The method of claim 3, wherein said first material comprises polystyrene.

5. The method of claim 1, wherein said second material comprises a crystalline material.

6. The method of claim 1, wherein said film comprises a crystalline ceramic material.

7. The method claim 6, wherein said crystalline ceramic material comprises an oxide ceramic material.

8. The method of claim 1, wherein said second material comprises FeOOH.

9. The method of claim 1, wherein the inorganic second material comprises oriented crystallites with the same crystal axis oriented perpendicular to the plane of the surface of the underlying substrate.

10. The method of claim 1, which further includes the step of maintaining the liquid solution at a temperature of not more than about 100 degrees C.

11. The method of claim 1, which further includes the step of chemically modifying only a portion of a surface of the underlying substrate to produce chemical changes comprising said nucleation sites on said underlying substrate, and contacting the chemically modified surface with the liquid solution of precursors of the inorganic second material to provide the crystallite growth of the second material onto said nucleation sites.

12. The method of claim 1, wherein the functional group comprises an alcohol, a thiol or a hydroxyl.

13. The method of claim 1 wherein the nucleation sites comprise functional groups selected from the group consisting of carboxylate, phosphate, sulfonate, amine, hydroxyl, thiol and alcohol.

14. The method of claim 1, wherein said inorganic material comprises an amorphous material.

15. The method of claim 7, wherein said oxide ceramic material comprises an iron oxide.

16. The method of claim 1, wherein said second material has an average maximum film thickness of not more than about 1000 angstroms.

17. The method of claim 1, wherein said second material comprises a continuous film.

18. The method of claim 1, wherein said second material comprises a ceramic material.

19. The method of claim 1, wherein said film is deposited by precipitation onto the underlying substrate.

20. The method according to claim 1 wherein the organic functional group comprise a surface attachment group connected to an alkyl chain.

21. The method of claim 1, wherein said first material is an organic material.

22. The method of claim 1, wherein said liquid solution is an aqueous solution.

23. A film produced by a method which comprises providing an underlying substrate of a first material comprising a material selected from the group consisting of: a polyimide, a metal, an oxide, silica, alumina, and glass; chemically modifying at least one surface of said underlying substrate by attaching thereto organic functional groups which provide nucleation sites for inducing crystallite growth of a second material on said underlying substrate; and contacting at least one chemically modified surface with a liquid solution of precursors of the second material for a sufficient period of time for the crystallite growth of a second material formed from the precursors of the second material in said liquid solution onto the modified underlying substrate under conditions sustaining the crystallite growth of a film of the second material on said functional groups.

24. The method of claim 23, wherein said film acomprises is an inorganic material.

25. The method of claim 23, wherein said second material comprise a ceramic material.

26. The method of claim 23, wherein said film is deposited by precipitation onto the underlying substrate.

27. The method according to claim 23 wherein the organic functional group comprise a surface attachment group connected to an alkyl chain.

28. The product of claim 23, wherein the functional group comprises an alcohol, a thiol or a hydroxyl.

29. A method for producing a film, comprising providing an underlying substrate of a first material; providing an aqueous liquid solution of a precursor material comprising at least one solute; chemically modifying at least one surface of said underlying substrate by attaching thereto organic functional groups which act as nucleation sites with said aqueous liquid solution thereby providing nucleation sites for crystallite growth of a second material onto said underlying substrate; introducing at least one chemically modified surface of the underlying substrate into said aqueous liquid solution of a precursor material; and maintaining the chemically modified surface in contact with the liquid solution for sufficient period of time for crystallite growth of a film of a second material comprising an inorganic crystalline material onto the modified underlying substrate by nucleation of the second material on said nucleation sites.

30. The method of claim 29, wherein the second material has a crystalline axis which is oriented normal to the surface of said underlying substrate.

31. The method of claim 29, wherein the second material comprises FeOOH.

32. The method of claim 29, wherein said inorganic crystallite material has the same crystalline axis oriented perpendicular with respect to the surface of the underlying substrate.

33. The method of claim 29, wherein said second material comprises a ceramic material.

34. The method of claim 29, wherein said film is deposited by precipitation onto the underlying substrate.

35. The method according to claim 29, wherein the organic functional groups comprise a surface attachment group connected to an alkyl chain.

* * * * *